United States Patent
Okuda

(10) Patent No.: US 10,307,876 B2
(45) Date of Patent: Jun. 4, 2019

(54) MACHINE TOOL

(71) Applicant: FANUC Corporation, Yamanashi (JP)

(72) Inventor: Shinji Okuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 177 days.

(21) Appl. No.: 15/341,062

(22) Filed: Nov. 2, 2016

(65) Prior Publication Data

US 2017/0144262 A1 May 25, 2017

(30) Foreign Application Priority Data

Nov. 20, 2015 (JP) .................................. 2015-227577

(51) Int. Cl.
| | |
|---|---|
| *B05B 13/04* | (2006.01) |
| *B08B 3/02* | (2006.01) |
| *B08B 9/00* | (2006.01) |
| *B08B 17/00* | (2006.01) |
| *B08B 17/02* | (2006.01) |

(Continued)

(52) U.S. Cl.
CPC .......... *B23Q 11/0042* (2013.01); *B05B 12/04* (2013.01); *B05B 13/0405* (2013.01); *B05B 13/0431* (2013.01); *B08B 3/024* (2013.01); *B08B 9/00* (2013.01); *B08B 17/025* (2013.01); *B23Q 11/005* (2013.01); *B23Q 11/0891* (2013.01); *B23Q 11/1076* (2013.01); *B23Q 17/2433* (2013.01); *B23Q 17/2452* (2013.01); *B08B 17/00* (2013.01); *Y02P 70/171* (2015.11)

(58) Field of Classification Search
CPC ........... B05B 13/04; B08B 3/024; B08B 9/00; B08B 17/00; B08B 17/025; B23Q 11/005; B23Q 11/0042; B23Q 11/0891; B23Q 11/1076; B23Q 17/2433; B23Q 17/2452; Y02P 70/171

USPC .............................................. 134/22.1, 57 R
See application file for complete search history.

(56) References Cited

U.S. PATENT DOCUMENTS

| | | | |
|---|---|---|---|
| 2002/0003415 A1 | 1/2002 | Nakai et al. | |
| 2004/0047700 A1* | 3/2004 | Maeda | B23Q 11/0891 409/134 |
| 2005/0126597 A1* | 6/2005 | Hochstein, Jr. | B08B 7/0007 134/22.1 |

FOREIGN PATENT DOCUMENTS

| | | |
|---|---|---|
| GB | 2166544 A | 5/1986 |
| JP | S5524856 A | 2/1980 |

(Continued)

OTHER PUBLICATIONS

Japanese Office Action for Japanese Application No. 2015-227577, dated Feb. 20, 2018, 5 pages.

*Primary Examiner* — Levon J Shahinian
(74) *Attorney, Agent, or Firm* — Hauptman Ham, LLP

(57) ABSTRACT

A machine tool has a cover that prevents chips generated by machining and cutting fluid from scattering around and a plurality of movable nozzles with liquid discharge directions thereof being movable so as to wash out chips that have adhered to or accumulated on an inner surface of the cover. The machine tool is capable of changing a discharge direction of each of the movable nozzles individually. The machine tool compares the state of the inside of the cover before start of machining with the state of the inside of the cover after chips are generated to determine an adhesion or accumulation state of chips. The machine tool thus calculates the liquid discharge direction to wash out chips from the movable nozzles based on a result of the determination.

10 Claims, 4 Drawing Sheets

(51) Int. Cl.
*B23Q 11/00* (2006.01)
*B23Q 11/08* (2006.01)
*B23Q 11/10* (2006.01)
*B23Q 17/24* (2006.01)
*B05B 12/04* (2006.01)

(56) References Cited

FOREIGN PATENT DOCUMENTS

| | | |
|---|---|---|
| JP | S61111878 A | 5/1986 |
| JP | H0326451 U | 3/1991 |
| JP | H0529655 U | 4/1993 |
| JP | H0567446 U | 9/1993 |
| JP | H10118884 A | 5/1998 |
| JP | H10180585 A | 7/1998 |
| JP | 2001062666 A | 3/2001 |
| JP | 2002018680 A | 1/2002 |
| JP | 2004017176 A | 1/2004 |
| JP | 2015024454 A | 2/2015 |
| JP | 2015024455 A | 2/2015 |

\* cited by examiner

MACHINE TOOL

RELATED APPLICATIONS

The present application claims priority to Japanese Patent Application Number 2015-227577, filed Nov. 20, 2015, the disclosure of which is hereby incorporated by reference herein in its entirety.

BACKGROUND OF THE INVENTION

1. Field of the Invention

The present invention relates to a machine tool that includes a movable nozzle for cleaning the inside of a machine.

2. Description of the Related

On a machine tool, a cover is provided so that chips generated during machining or cutting fluid used for machining do not scatter around the machine tool. Although the cover can prevent chips and cutting fluid from scattering around the machine tool, chips may adhere to the inner surface of the cover and accumulates thereon as machining is continued.

As a technique for preventing such accumulation of chips on the inside of a cover, for example, Japanese Utility Model Application Laid-Open No. 05-067446 discloses a technique in which a scraper is provided on a saddle moving back and forth during a machining cycle, a chip washing liquid supplying pipe is provided on an oil pan, and a nozzle is provided on this chip washing liquid supplying pipe, wherein the scraper collects chips with the saddle moving back and forth and liquid discharged from the nozzle washes out the chips. Furthermore, Japanese Utility Model Application Laid-Open No. 05-029655 discloses a technique in which a pipe including a nozzle hole for discharging washing liquid therefrom is fixed on a saddle, and the pipe is moved with the saddle moving back and forth to wash out chips in a wide range.

However, although both of the prior art techniques described above wash out chips accumulated on the inside of a cover, the orientation of the nozzle is fixed and thus the flow of the chip washing liquid is stationary. With this, stagnation is easily generated in the flow of the liquid and a chip accumulation part is easily generated. Furthermore, the orientation of the nozzle cannot be freely changed in accordance with the machining conditions.

Furthermore, Japanese Utility Model Application Laid-Open No. 03-026451 discloses a technique in which a rotation controller is assembled to a showering device arranged on the ceiling side of a machining area of a machine tool body and the rotation controller automatically adjusts the orientation of a showering nozzle attached to the showering device during machining of a workpiece in accordance with a command programmed in advance for each workpiece. Furthermore, Japanese Patent Application Laid-Open No. 10-180585 discloses a technique in which a chip removing unit including a nozzle that injects pressurized fluid while making oscillating motion of two-degree-of-freedom is attached to the inside of a splash guard and the pressurized fluid is injected toward a workpiece or the upper surface of a table during machining to cause chips to drop into a chip recovery groove.

However, both of the prior art techniques described above inject liquid to a workpiece or a table during machining to cause chips that has been adhered to or accumulated on the workpiece or the upper surface of the table to drop onto the lower part of the cover, but do not wash out chips that has been adhered to or accumulated on the inside of the cover. With the prior art technique disclosed in Japanese Utility Model Application Laid-Open No. 03-026451 described above, the entire pipe to which the nozzle is attached is driven. With this, even when a plurality of nozzles are provided, the nozzles make the same motion and cannot be controlled to have individual orientations. Because the nozzles can only make motions programmed in advance, the orientations of the nozzles cannot be changed in accordance with the conditions.

None of the prior art techniques described above cannot perform individual control of liquid discharge from nozzles.

SUMMARY OF THE INVENTION

The object of the present invention is to provide a machine tool that detects a position in the inside of a cover where adhesion and accumulation of chips generated by machining occur and effectively discharges the chips.

A machine tool according to the present invention includes covers that cover a table on which a workpiece is placed and a machining area and prevents chips generated by machining and cutting fluid from scattering around, and a plurality of movable nozzles of which discharge directions of liquid for washing out chips that have adhered to or accumulated on an inner surface of each of the covers are adjustable. A discharge direction of each of the plurality of movable nozzles is capable of being changed individually. The machine tool further includes: a detection device that detects a state of the inside of the cover; a pre-machining storage unit in which a state of the inside of the cover before start of machining, which is detected by the detection device, is stored; a post-machining storage unit in which a state of the inside of the cover after chips are generated by the machining is stored; a chip state determination unit that compares the state of the inside of the cover before start of machining, which is stored in the pre-machining storage unit, with the state of the inside of the cover after chips are generated by the machining, which is stored in the post-machining storage unit, to determine an adhesion or accumulation state of chips; and a discharge direction calculation unit that calculates, based on a result of the determination made by the chip state determination unit, the discharge direction of the liquid from the movable nozzles that washes out chips.

The device may be an imaging device or a heat detection device.

The machine tool may further include a moving unit to which the detection device is provided, and the moving unit may be configured to moves the detection device into the inside of the cover from the outside of the cover during detection performed by the detection device.

The moving unit may be a robot.

At least one of the movable nozzles may be provided with a switching valve.

Driving of the movable nozzle may be performed with a motor or a robot.

The present invention detects a position where adhesion and accumulation of chips occur, whereby chips can be effectively washed out. Furthermore, the present invention stops liquid discharge when detecting the fact that no adhesion or accumulation of chips occurs, whereby power consumption can be reduced.

BRIEF DESCRIPTION OF THE DRAWINGS

These and other objects and features of the present invention will become apparent from the following description of embodiments with reference to the accompanying drawings in which.

DETAILED DESCRIPTION OF THE PREFERRED EMBODIMENTS

Figure 1A:
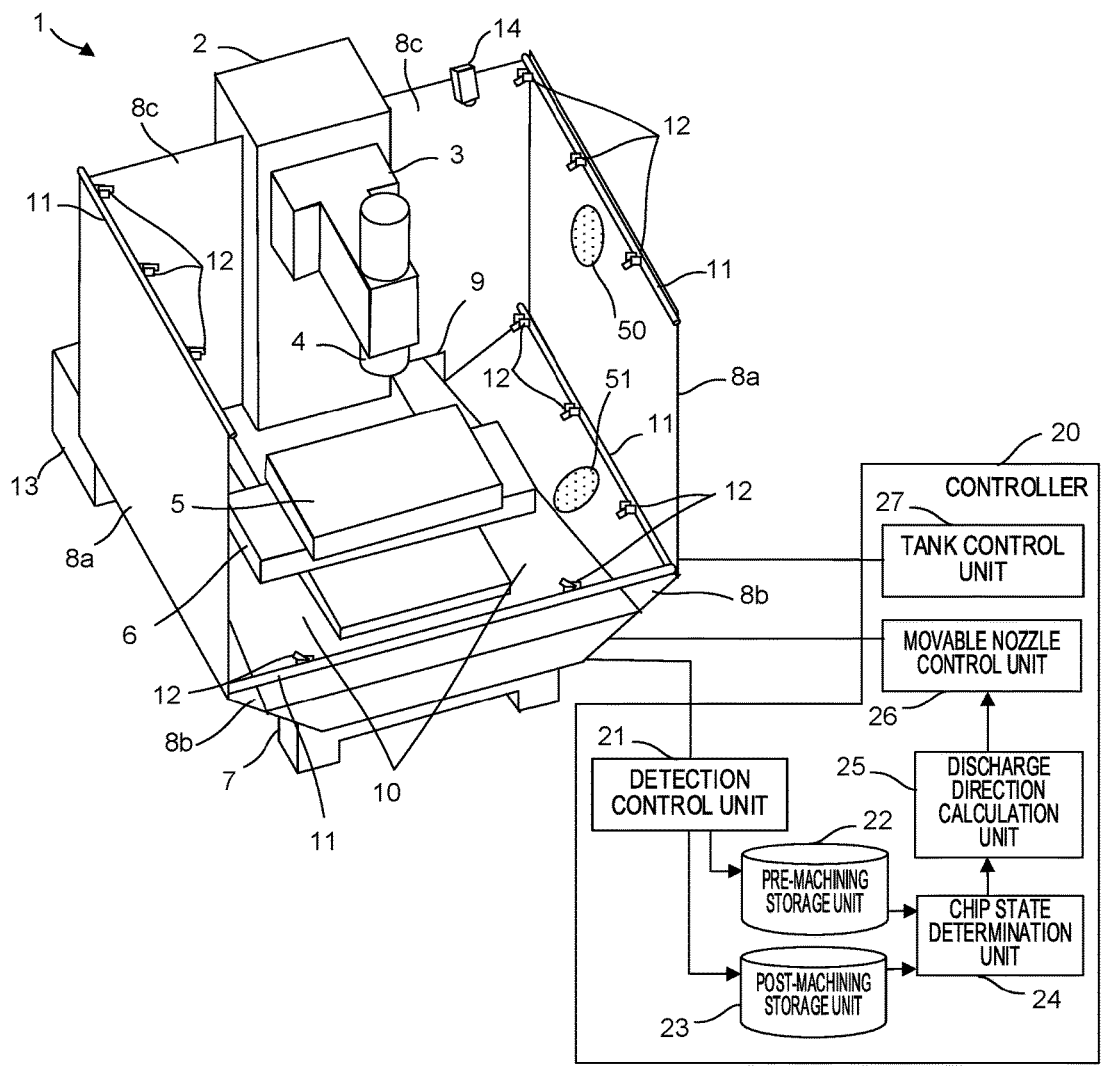
FIGS. 1A and 1B are overview configuration diagrams of a machine tool according an embodiment of the present invention, FIG. 1A being a perspective view of a machine tool and FIG. 1B being a top view of the machine tool (with a back cover removed)

The overview configuration of a machine tool according to an embodiment of the present invention will be described with reference to FIGS. 1A and 1B.

A machine tool 1 includes a table 5 movably installed with a saddle 6 and a spindle 4 attached to a spindle head 3 supported by a column 2, and the table 5 and the spindle 4 are installed on a bed 7. This table 5 is movably installed on the saddle 5, and a workpiece as a machining target is fixed to the table 5. A tool for machining the workpiece can be attached to the spindle 4.

The entire machining area, where workpiece machining is performed, of the machine tool 1 is covered by a cover 8 (side cover 8a, bottom cover 8b, and back cover 8c) that prevents chips generated by machining and cutting fluid from scattering around. Furthermore, on the machine tool 1, a pipe 11 is arranged from the outside of the cover 8 through the inside of the cover 8. On the pipe 11 inside the cover 8, a plurality of nozzles the discharge directions of which can be changed (hereinafter, such a nozzle is referred to as a movable nozzle) 12 are further attached. Liquid supplied from a tank 13 provided at the back surface of the machine tool 1 through the pipe 11 is discharged in the adjusted discharge direction from each of the movable nozzles 12. The liquid discharged from each of the movable nozzles 12 washes out chips 50 adhered to the inner surface of the cover 8 and chips 51 accumulated on the inner surface of the cover 8, the cover 8 being in the discharge direction of the corresponding movable nozzle 12. The chips 50 and 51 washed out by the liquid discharged from the movable nozzles 12 flow with the liquid in a chip recovery groove 10 formed by the bottom surface of the machine tool 1 and the bottom cover 8b to be discharged to the outside of the cover 8 through a chip discharge port 9 provided on the back cover 8c and collected by the tank 13 provided on the back surface of the machine tool 1. In the inside of the tank 13, from the liquid mixed with the chips, chips are separated using a filter, for example, to be reused.

In the machine tool 1, in addition to the above-described structure, a detection device 14 such as a camera for detecting the state of each position inside the cover 8 is installed.

In the machine tool 1, adjustment (change) of the discharge direction of each of the movable nozzles 12, liquid supply from the tank 13, a detection operation performed by the detection device 14, and other operations are controlled by a controller 20. This controller 20 includes, in addition to a functional means used for the general control of machining, a detection control unit 21, a pre-machining storage unit 22, a post-machining storage unit 23, a chip state determination unit 24, a discharge direction calculation unit 25, a movable nozzle control unit 26, and a tank control unit 27.

In the controller 20 illustrated in FIG. 1A, the detection control unit 21 controls the detection device 14 before workpiece machining by the machine tool 1 is started to detect the state of each position of the inside of the cover 8, thereby acquiring data that indicates the state of the inside of the cover 8 before start of machining, and causes the pre-machining storage unit 22 to store therein the acquired data. While machining is performed by the machine tool 1 or after machining is completed, the detection control unit 21 controls the detection device 14 to detect the state of each position of the inside of the cover 8, thereby acquiring data that indicates the state of the inside of the cover 8 after completion of machining, and causes the post-machining storage unit 23 to store therein the acquired data. It should be noted that chips not only drop onto the bottom of the cover 8 (the inner surface of the bottom cover 8b) due to gravity but also adheres to the inner wall part of the cover 8 (the inner surfaces of the side cover 8a and the back cover 8c) due to adhesion of the cutting fluid. For this reason, the detection targets of the detection device 14 include the inner wall part of the cover 8 as well as the bottom of the cover 8.

Detection of the state of the inside of the cover 8 may be constantly performed while machining is performed and chips are generated, and may be performed intermittently. When the detection device is a visual sensor such as a camera, for example, data indicating the state of the inside of the cover 8 includes image data acquired by that visual sensor, and in the form of such image data, the shape of the inside of the cover 8 before start of machining can be stored in the data.

Figure 2:
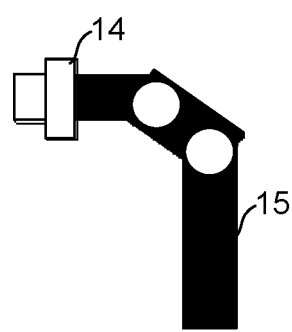
FIG. 2 is a diagram illustrating an example in which a detection device that detects a state of each position in the inside of a cover of the machine tool illustrated in FIGS. 1A and 1B is attached to a robot hand instead of the cover of the machine tool.

The detection device 14 does not have to be installed in the inside of the cover 8 all the time, and as illustrated in FIG. 2, for example, may be attached to a moving means 15 such as a robot to wait in the outside of the cover 8 normally. Only when detection becomes necessary, the moving means 15 may move to the inside of the cover 8 through a door (not illustrated) of the cover 8.

The chip state determination unit 24 compares data indicating the shape of the inside of the cover 8 before machining starts, which has been stored in the pre-machining storage unit 22, with data indicating the shape of the inside of the cover 8 after machining is completed (after chips are generated), which has been stored in the post-machining storage unit 23, to determine a shape which has increased by an amount exceeding a predetermined shape error, as adhesion or accumulation of chips. When such adhesion or accumulation of chips have been determined, the chip state determination unit 24 calculates the position, the range, and the thickness of the adhesion or accumulation of chips in the inside of the cover 8 and records a result of the calculation in a memory (not illustrated).

The discharge direction calculation unit 25 selects at least one of the plurality of movable nozzles 12 (a movable nozzle 12 corresponding to the position of adhesion or accumulation of chips that has been determined) based on the position of the adhesion or accumulation of chips which has been determined by the chip state determination unit 24, and calculates the discharge direction thereof so that the discharge direction of the selected movable nozzle 12 is in the direction which allows the adhered or accumulated chips to be washed out to the outside of the cover 8 with liquid discharged from the movable nozzle 12.

Meanwhile, a memory (not illustrated) in the controller 20 stores therein in advance the installation position and liquid discharge range of each of the movable nozzles 12 installed in the cover 8. The discharge direction calculation unit 25 performs selection of a movable nozzle 12 and calculation of the discharge direction of the selected movable nozzle 12 (and the discharge direction of a movable nozzle 12 in the vicinity of a chip discharge path described later) based on the installation position and liquid discharge range of each of the movable nozzles 12 that are stored in the memory and the position of the adhered or accumulated chips that has been calculated by the chip state determination unit 24. It should be noted that the discharge direction calculation unit 25 may estimate by simulation, based on the position of the accumulated chips 51, the path through which the chips 51 are discharged to the outside of the cover 8 through the chip recovery groove 10 and select, as an adjustment target of liquid discharge direction, a plurality of movable nozzles 12 located in the vicinity of the estimated chip discharge path. In this manner, the chips 51 can be discharged to the outside of the cover 8 more effectively.

The movable nozzle control unit 26 performs switching control of the switching valve of the movable nozzle 12 selected by the discharge direction calculation unit 25 and control of adjusting the discharge direction of that movable nozzle 12 to the discharge direction calculated by the discharge direction calculation unit 25.

The tank control unit 27 controls liquid supply from the tank 13 to start liquid supply to the pipe 11, whereby liquid is discharged from the movable nozzle 12.

Figure 1B:
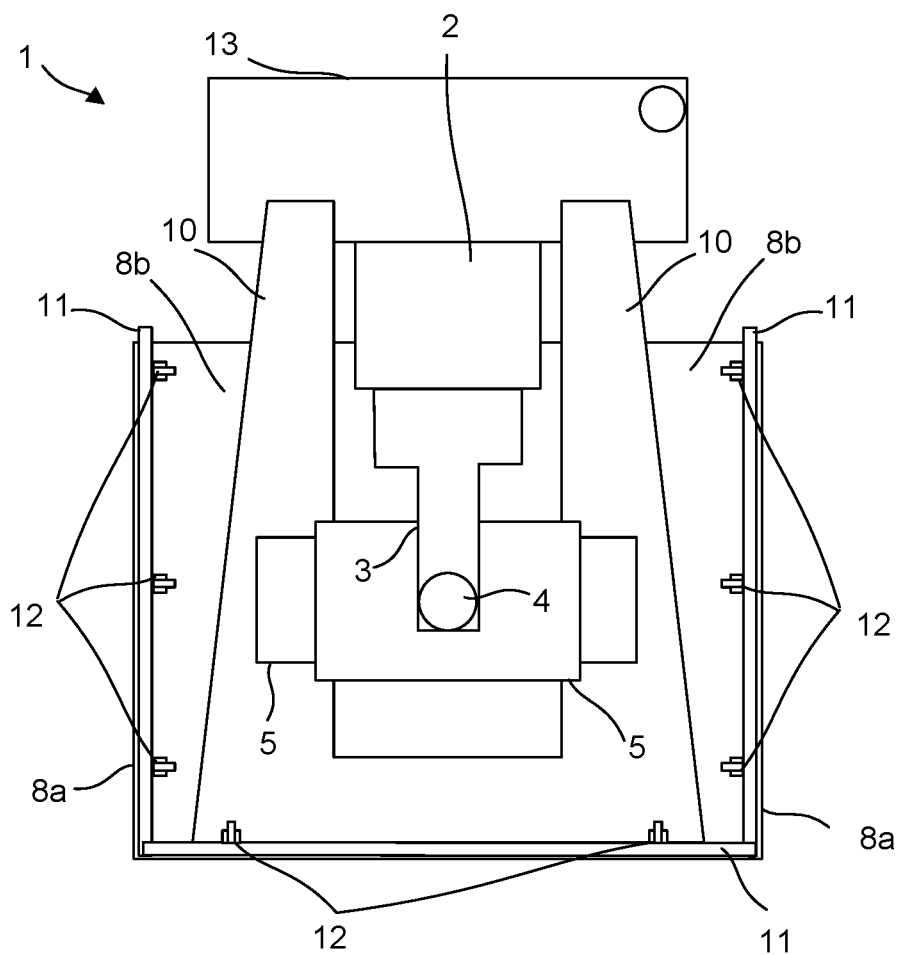
Figure 3:
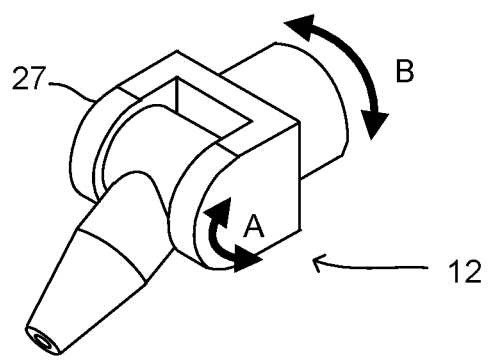
FIG. 3 is an overview configuration diagram of a movable nozzle used in the machine tool illustrated in FIGS. 1A and 1B.

FIG. 3 is an overview configuration diagram of a movable nozzle 12 used in the machine tool illustrated in FIGS. 1A and 1B.

The movable nozzle 12, as illustrated in FIG. 3, has a nozzle tip that oscillates in the direction of the arrow A in FIG. 3, and at the same time, the entire movable nozzle 12 rotates in the direction of the arrow B in FIG. 3. When a movable part (oscillating part) of the movable nozzle 12 can be driven by a motor, the drive of the motor is controlled by the movable nozzle control unit 26, whereby the liquid discharge direction can be adjusted to the discharge direction calculated by the discharge direction calculation unit 25.

Figure 4:
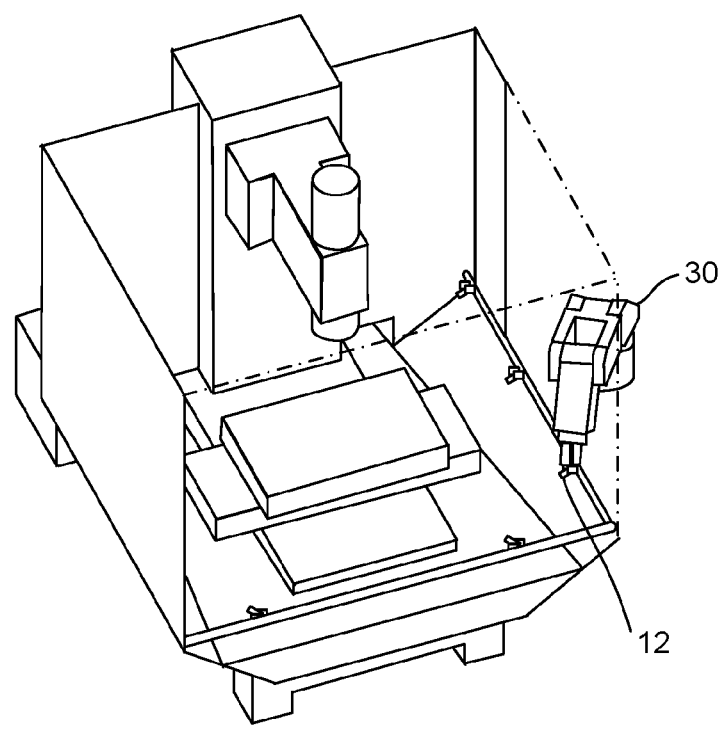
FIG. 4 is a diagram illustrating an example in which the discharge direction of the movable nozzle used in the machine tool illustrated in FIGS. 1A and 1B can be changed by using a robot.

Furthermore, even when a driving means such as a motor is not provided on a movable part of the movable nozzle 12, as illustrated in FIG. 4, for example, the movable nozzle control unit 26 controls a robot 30 provided with an end effector (grasping hand) to cause the end effector to enter into the inside of the cover 8 through a door of the cover 8. By causing the end effector of the robot 30 to grasp the tip of the movable nozzle 12 selected as a moving target and move the movable nozzle 12, the liquid discharge direction can be adjusted to the discharge direction calculated by the discharge direction calculation unit 25. When the latter configuration is employed, the movable nozzle 12 can be a more simple structure such as a bellows.

Figure 5:
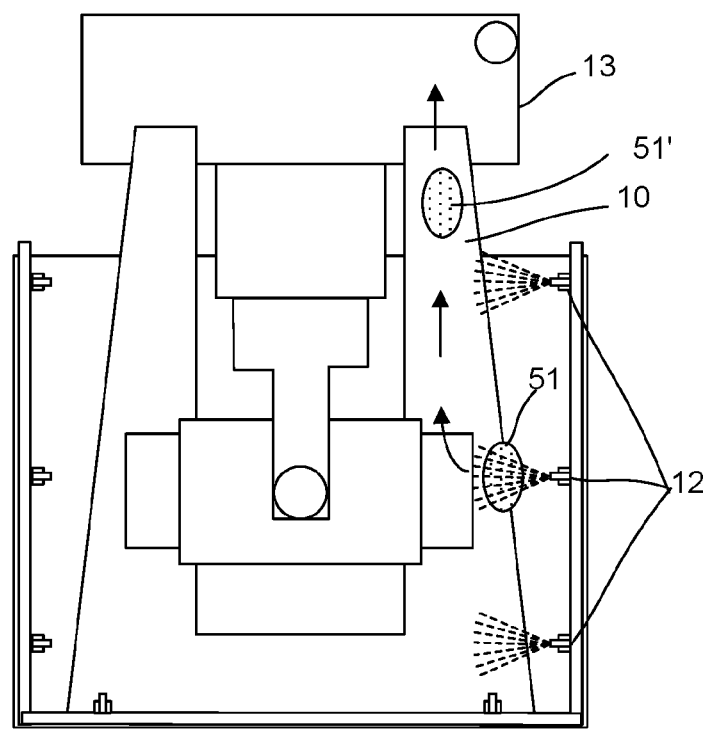
FIG. 5 is a diagram illustrating a first example in which chips accumulated in the machine tool illustrated in FIGS. 1A and 1B are washed out with liquid discharged from the movable nozzle.

FIG. 5 is a diagram illustrating a first example in which chips 51 accumulated in the machine tool illustrated in FIGS. 1A and 1B are washed out with liquid discharged from the movable nozzle 12. It should be noted that in FIG. 5, illustration of the back cover 8*c* and the detection device 14 is omitted.

As illustrated in FIG. 5, when the detection device 14 detects that the chips illustrated by the reference numeral 51 in FIG. 5 has accumulated on a part of the bottom of the cover 8, the discharge direction calculation unit 25 selects movable nozzles 12 (three movable nozzles on the right side of FIG. 5) in the vicinity of the position of the chips 51 and in the vicinity of a discharge path along which the chips 51 are assumed to be discharged. Under the control of the movable nozzle control unit 26 and the tank control unit 27, liquid is discharged from each of the movable nozzles 12 to discharge the chips 51 to the outside of the cover 8 along the chip recovery groove 10. The chips 51 are then collected by the tank 13 (the reference numeral 51' in FIG. 5 represents the chips moving along the chip recovery groove 10).

Figure 6:
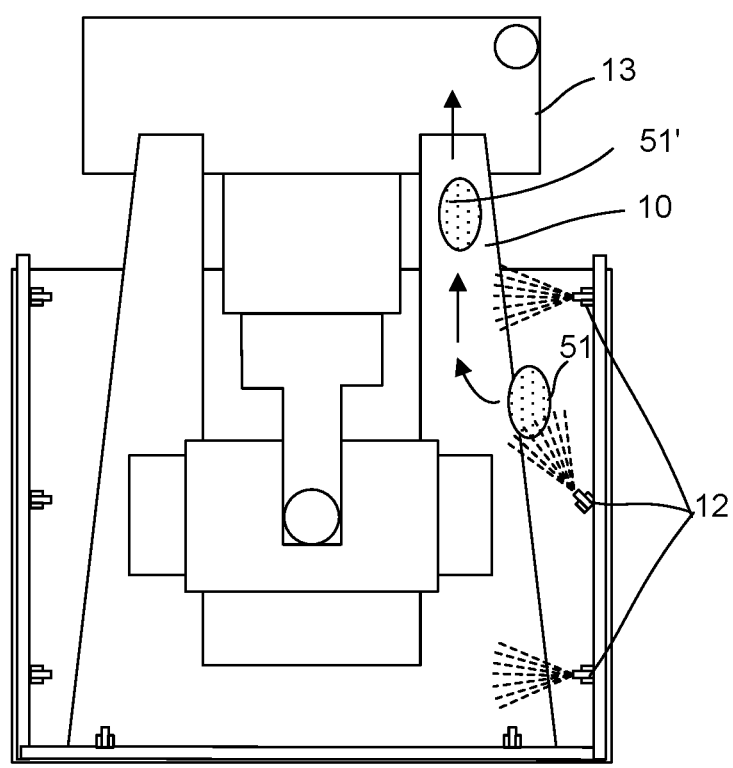
FIG. 6 is a diagram illustrating a second example in which chips accumulated in the machine tool illustrated in FIGS. 1A and 1B are washed out with liquid discharged from the movable nozzle.

FIG. 6 is a diagram illustrating a second example in which chips 51 accumulated in the machine tool illustrated in FIGS. 1A and 1B are washed out with liquid discharged from the movable nozzle 12. It should be noted that in FIG. 5, illustration of the back cover 8*c* and the detection device 14 is omitted.

As illustrated in FIG. 6, when the detection device 14 detects that the chips 51 has accumulated on a position displaced from the nozzle orientations of all movable nozzles 12 at the bottom of the cover 8, the discharge direction calculation unit 25 selects movable nozzles 12 (three movable nozzles on the right side of FIG. 6) in the vicinity of the position of the chips 51 and in the vicinity of a discharge path along which the chips 51 are assumed to be discharged. Furthermore, out of the selected movable nozzles 12, the discharge direction of the movable nozzle 12 that is the closest to the accumulated chips 51 is calculated. Under the control of the movable nozzle control unit 26 and the tank control unit 27, liquid is discharged from each of the movable nozzles 12 to discharge the chips 51 to the outside of the cover 8 along the chip recovery groove 10. The chips 51 are then collected by the tank 13 (the reference numeral 51' in FIG. 6 represents the chips moving along the chip recovery groove 10).

Although an embodiment of the present invention has been described above, the present invention is not limited to the example in the above-described embodiment and may be implemented in various aspects by adding appropriate modifications.

For example, in the above-described embodiment, the detection device 14 detects the shape of the inside of the cover 8 before start of machining and the shape of the inside of the cover 8 during machining or after completion of machining and compares the detected shapes with each other to determine adhesion or accumulation of chips. Alternatively, the fact that the brightness or the color gamut of an image of a part where adhesion or accumulation of chips occurs differs from the brightness or the color gamut of an image of any normal part of the inside of the cover 8 may be used. In this case, a template image that indicates the brightness and the color gamut of the inside of the cover 8 is stored in advance, and the template image is compared with data indicating the shape of the inside of the cover 8 during machining or after completion of machining to find a part where the brightness difference is equal to or higher than a preset threshold. The part thus found may be determined as a part that requires washing.

Alternatively, a specific mark or pattern may be provided to the inside of the cover 8 so that a part where the mark or the pattern has become unrecognizable after machining may be determined as a part that requires washing.

As the detection device 14 in the above-described embodiment, a distance sensor may be used instead of a visual sensor such as a camera. The distance from each of the distance sensors in various parts in the inside of the cover 8 in a state in which no accumulation of chips occurs may be compared with the distance from each of the distance sensors in the corresponding parts in the inside of the cover 8 after completion of machining, and a part where a difference therebetween (a value corresponding to the thickness of adhesion or accumulation of chips) becomes equal to or higher than a preset threshold may be determined as a part where chips have accumulated so that these chips have to be washed out.

As the detection device 14 in the above-described embodiment, heat detection means such as thermography may be used instead of a visual sensor such as a camera. Heat distribution in the inside of the cover 8 in a state in which there are no chips may be stored in advance before start of machining, and after chips are generated due to machining, heat distribution in the inside of the cover 8 may be detected. Then, the heat distribution thus detected may be compared with the heat distribution thus stored in advance, thereby determining a position where chips with heat generated by machining have adhered to or accumulated on.

Furthermore, when it is detected that chips have adhered to or accumulated on over a wide range, the movable nozzles 12 may be oscillated under the control of the movable nozzle control unit 26. When it is detected that chips have adhered to or accumulated on a plurality of locations, the discharge direction calculation unit 25 may select a plurality of movable nozzles 12, each of which is in the vicinity of chips that have adhered or accumulated, as a target for liquid discharge. The discharge direction of each of the selected movable nozzles 12 may be calculated such that each movable nozzle 12 is moved to be oriented in the calculated discharge direction thereof, under the control of the movable nozzle control unit 26.

When it is determined that no adhesion or accumulation of chips occurs, the movable nozzle control unit 26 may shut off the switching valve of the movable nozzles 12 or the tank control unit 27 may stop supplying liquid from the tank 13, so that liquid discharge from the movable nozzle 12 is stopped. Furthermore, as in the above-described embodiment, when a switching valve is provided on each of the movable nozzles 12, the switching valve of the movable nozzles 12 other than a selected movable nozzle 12 may be shut off, so that the liquid amount discharged from the selected movable nozzle 12 is increased, whereby the efficiency of washing out the chips can be improved. It should be noted that a switching valve may be provided not only on each of the movable nozzles 12, but may be provided on the pipe 11.

Furthermore, as illustrated in FIG. 6, after one movable nozzle 12 is controlled to be oriented in the direction of accumulated chips 51 and has discharged liquid for a predetermined period of time under the control, the detection device 14 may perform detection again. When it is determined by the detection that the accumulated chips 51 remain in the same position, the discharge direction calculation unit 25 may change the discharge direction of another movable nozzle 12, in addition to the movable nozzle 12 the discharge direction of which has been firstly directed to the chips 51, to the direction toward the chips 51. Collecting the chips 51 in the outside of the cover 8 may be thus attempted with two or more movable nozzles 12. In this manner, the washing intensity may be changed step by step.

The invention claimed is:

1. A machine tool, comprising:
   a table;
   a cover that covers (a) the table on which a workpiece is to be placed and (b) a machining area, to prevent chips generated by machining and cutting fluid from scattering around;
   a plurality of movable nozzles configured to discharge liquid for washing out chips that have adhered to or accumulated on an inner surface of the cover, wherein a discharge direction of the liquid from each of the plurality of movable nozzles is individually adjustable;
   a detection device configured to detect a state of an inside of the cover;
   a pre-machining storage configured to store a state of the inside of the cover before start of machining, which is detected by the detection device;
   a post-machining storage configured to store a state of the inside of the cover after chips are generated by the machining;
   a chip state determination unit configured to compare the state of the inside of the cover before start of machining, which is stored in the pre-machining storage, with the state of the inside of the cover after chips are generated by the machining, which is stored in the post-machining storage, to determine an adhesion or accumulation state of chips; and
   a discharge direction calculation unit configured to calculate, based on a result of the determination made by the chip state determination unit, the discharge direction of the liquid from each of the plurality of movable nozzles to wash out chips generated by the machining.

2. The machine tool according to claim 1, wherein the detection device is an imaging device.

3. The machine tool according to claim 2, further comprising:
   a moving unit to which the detection device is provided, wherein
   the moving unit is configured to move the detection device into the inside of the cover from an outside of the cover during detection performed by the detection device.

4. The machine tool according to claim 3, wherein the moving unit is a robot.

5. The machine tool according to claim 1, wherein the detection device is a heat detection device.

6. The machine tool according to claim 1, wherein at least one nozzle of the plurality of movable nozzles is provided with a switching valve.

7. The machine tool according to claim 1, further comprising:
   a motor configured to move the plurality of movable nozzles.

8. The machine tool according to claim 1, further comprising:
   a robot configured to move the plurality of movable nozzles.

9. The machine tool according to claim 1, wherein
   the cover extends around a space in which the table is arranged, and
   the plurality of movable nozzles is arranged on the cover around the table.

10. The machine tool according to claim 1, wherein
at least one nozzle of the plurality of movable nozzles has a movable nozzle tip, and
the machine tool further comprises a robot configured to move the nozzle tip of said at least one nozzle to individually adjust the discharge direction of the liquid from said at least one nozzle to the discharge direction calculated by the discharge direction calculation unit for said at least one nozzle.

* * * * *